Oct. 18, 1949.　　T. F. BROADY ET AL　　2,484,814
SHIP RECOGNITION TRAINER

Filed Dec. 20, 1946　　2 Sheets-Sheet 1

INVENTOR.
THOMAS F. BROADY
BY LEONARD C. MARCHESKI
ROBERT C. HEERDINK
M.O.Hayes
ATTORNEY Oct. 18, 1949.  T. F. BROADY ET AL  2,484,814
SHIP RECOGNITION TRAINER
Filed Dec. 20, 1946  2 Sheets-Sheet 2

INVENTOR.
THOMAS F. BROADY
BY LEONARD C. MARCHESKI
ROBERT C. HEERDINK
ATTORNEY

Patented Oct. 18, 1949

2,484,814

UNITED STATES PATENT OFFICE 2,484,814

SHIP RECOGNITION TRAINER

Thomas F. Broady, Maryville, Tenn., and Robert C. Heerdink, Los Angeles, and Leonard C. Marcheski, Lynwood, Calif.

Application December 20, 1946, Serial No. 717,365

3 Claims. (Cl. 35—25)

(Granted under the act of March 3, 1883, as amended April 30, 1928; 370 O. G. 757)

This invention relates to training devices and in particular to a ship-recognition trainer.

The most common methods of ship-recognition training use slides projected on a screen or scale models. In the use of slides, students sometimes learn the slides by some insignificant detail of the picture rather than by learning the characteristics of the ships. Even when silhouettes showing no unnecessary details are used, only a limited number of views of any one subject can be shown because of the number of slides required. Comparisons of similar types of ships are also limited because special slides having two pictures side by side are required. Using scale models of ships for recognition training eliminates these disadvantages, but when placed on a bare table, scale models are in an unrealistic setting and there is no way to control the illumination to represent the ships under different lighting conditions encountered in actual practice. Therefore, an apparatus was desired which provides a realistic setting with illumination that can be varied to give various lighting effects for the models.

An object of this invention is to provide an apparatus for ship-recognition training giving a realistic setting with controllable lighting effects for models of ships.

Another object is to provide an apparatus for ship-recognition training permitting a wide range of combinations of ships at various angles to the observer.

Figure 1:
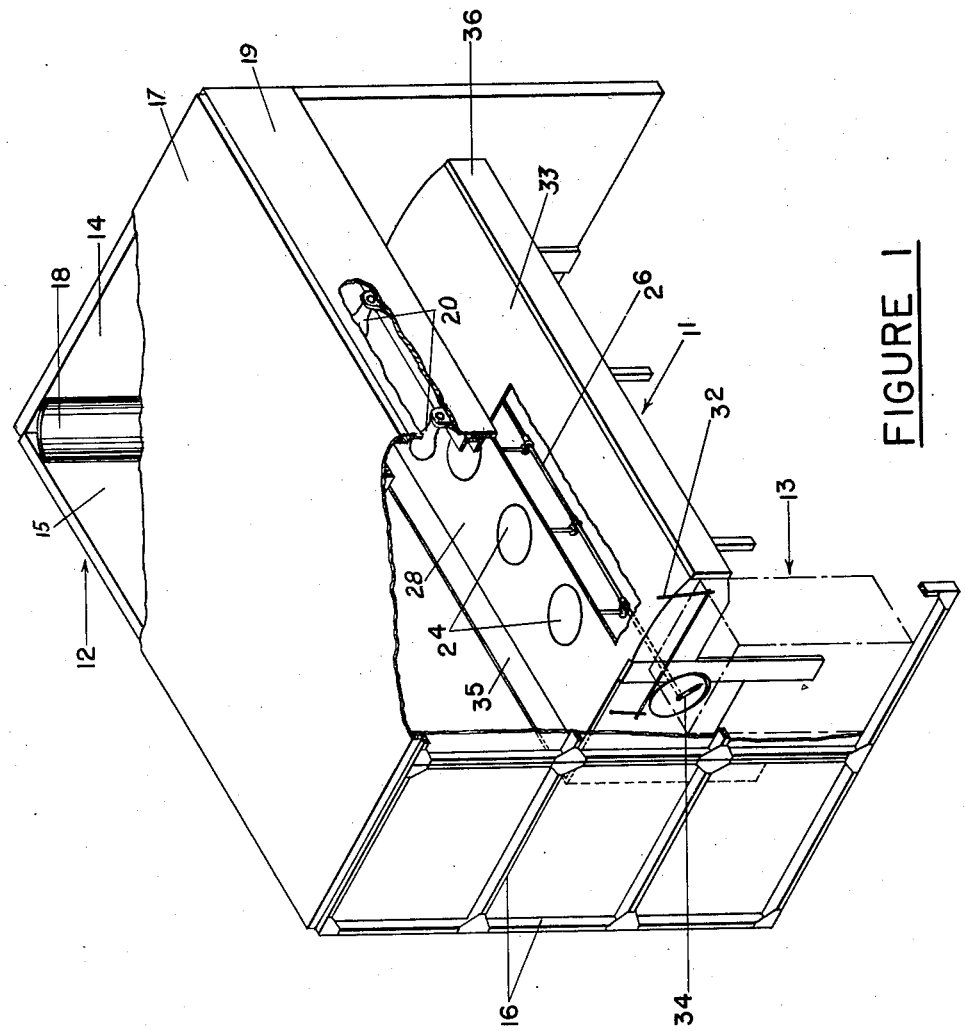
Figure 2:
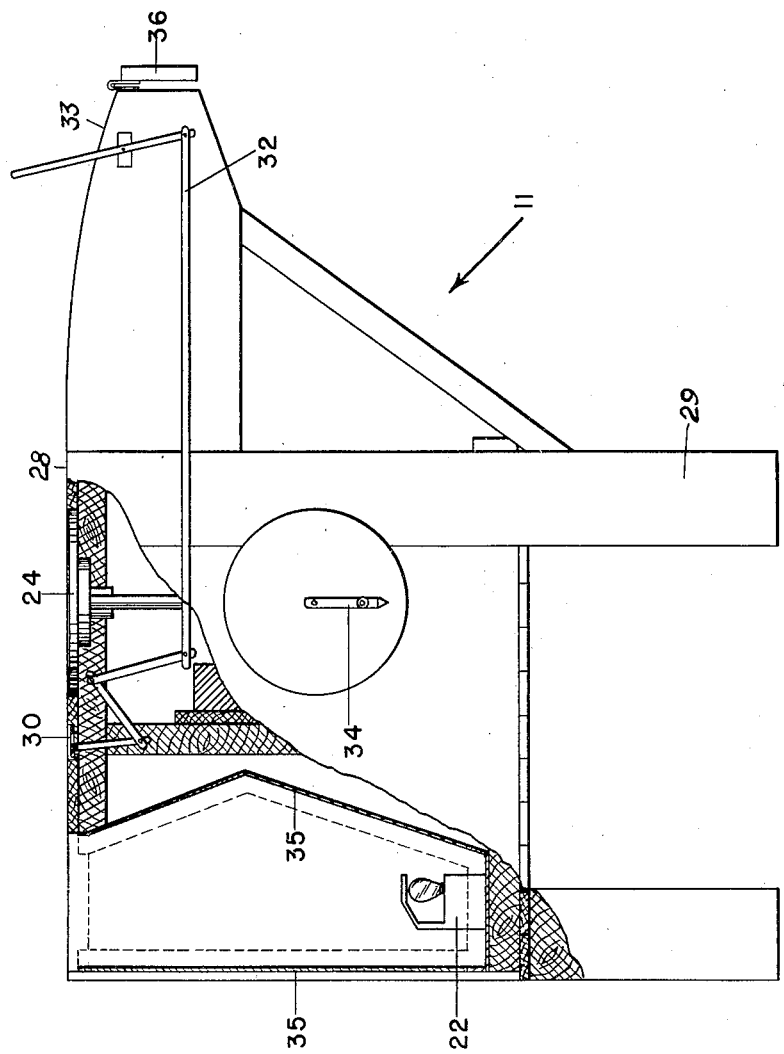

Further objects and advantages of this invention, as well as its construction, arrangement and operation, will be apparent from the following description and claims in connection with the accompanying drawings, in which Fig. 1 is a perspective view, partly broken away, of one embodiment of this invention, and Fig. 2 is a side view, partly broken away, of the stage shown in Fig. 1.

The disclosed embodiment of the invention comprises the stage 11 supported by the legs 29, Fig. 2. The stage 11 is in the form of a platform as shown, the top surface 28 thereof being a seascape, and accordingly being painted and otherwise constructed to represent the surface of the sea.

Upright background scenery 12 encloses the stage 11 on three sides, and extends upwardly from the level of the top surface 28 thereof. The upright scenery 12 comprises the back section 15 which extends along the back of the stage 11, and the end sections 14 which extend forwardly from the back section 15 and along each of opposite ends of the stage 11. The background scenery 12 is painted and otherwise constructed to represent the sky.

A plurality of student observers are placed some distance in front of the apparatus and observe model ships placed on the top surface 28 of stage 11. The model ships may be distributed over the seascape 28 in an arrangement suitable for a given observation exercise. The student observers view the stage 11 from the front, looking into the space between the end sections 14. The stage presents a convincing simulation of a group of ships at sea, as they are commonly observed, for example, from the deck of another ship.

Background scenery 12 may be made of any suitable material, such as composition board, which is attached to and supported by a frame 16. The corners of the upright scenery 12 are rounded off by curved pieces 18 of sheet metal or the like thin material. The inside surface of the background scenery 12 is painted light blue to resemble the sky.

The cover 17 may be provided to cover the stage 11 throughout the extent of the background scenery 12. It is also desirable to include the front drop or canopy 19 to limit the view of the scene upwardly from the top 28 of stage 11, the scene being thus framed by the surface 28, the end sections 14 and the canopy 19.

A bank of lamps 20 is mounted behind the canopy 19 in position to direct light onto the top surface 28 of the stage 11 and towards the background scenery 12. This serves to illuminate the stage 11 to resemble daylight. Another bank of lamps 22, shown in Fig. 2, is preferably contained in a housing 35 of sheet metal or the like suitable material, and is positioned at a level below the stage surface 28. The back section 15 of the background scenery 12 is spaced away rearwardly from the stage 11, and the lamps 22 direct light upwardly against the back section 15 and through the space between the back section and the stage surface 18 to provide illumination of the background scenery 12 upwardly from and behind stage 11 to resemble a twilight horizon. Lamp banks 20 and 22 are controlled by switches and variable autotransformers mounted in control box 13. Special lighting effects such as moonlight and fire-at-sea may also be provided, if desired, and controlled from control box 13.

For use in training in estimation of target angles, or in demonstration of how the appearance of a ship changes with heading, bearing circles 24 are provided distributed in various places along the stage 11. The bearing circles comprise discs 24 that are positioned embedded in the surface 28 as shown in Fig. 2, and are mounted to be rotatable. The several discs 24 are preferably driven in synchronism from shaft 26 by means of bevel gears. The crank 34 is keyed to the shaft 26, and is rotatable manually to rotate the bearing circles 24, the crank 34 also serving as a pointer to indicate the positions of the bearing circles.

The top surface 28 of the stage 11 is preferably made of composition board covered with heavy crepe paper and painted a flat dark blue. With the size models usually used with this trainer, the wrinkles in crepe paper resemble waves. The surface 28 is preferably curved downwardly at 33 along the forward edge of stage 11, so that models placed on the curved part 33 of seascape 28 will resemble ships closer than the horizon while models placed on the flat part will resemble ships at the horizon. To simulate ships beyond the horizon, a hinged flap 30, Fig. 2, extends along the stage 11, and is positioned to lie embedded in the surface 28 where it is not observable when in its lowered position. Linkage 32 comprising a system of levers is operable manually to tilt the flap 30 upwardly to project it upwardly from the surface 28 to any desired extent. Model ships positioned rearwardly of and behind the flap 30 are masked to a greater or less extent and thereby given a hull down appearance.

The flap 36 is positioned along the front edge of the stage 11 to hang downwardly therefrom, and is hinged as shown to enable it to be raised to hide the seascape of surface 28 and shield the models from view while they are being changed. Curtains may be placed around the trainer to shield everything but the essential stage area from view.

When lamp bank 20 is lighted and at full brilliance, models of ships placed on stage 11 are illuminated so that the details of the models are clearly visible, resembling bright daylight. When lamp bank 20 is turned out and lamp bank 22 is on, the models are silhouetted against the background, as ships are on a twilight horizon. By having lamp bank 20 dimmed and lamp bank 22 on, lighting conditions between bright daylight and twilight can be obtained. By having lamp bank 20 out and lamp bank 22 dimmed, the models will appear only in dim outline for training in "mass outline" recognition technique.

In using bearing circles 24 for training in estimation of the heading of a ship, models are placed on each bearing circle at a 000° heading, the students being lined up in front of each of the models and each student is instructed to work from only the model directly ahead of him. Since bearing circles 24 are driven in synchronism, all students will be looking at models having the same orientation.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In apparatus for use in ship-recognition training, a stage constructed to represent the surface of the sea, upright background scenery extending upwardly of the stage and being constructed to represent the sky, the background scenery enclosing the stage on three sides and comprising a back section along the back of the stage and end sections extending forwardly from the back section at each of opposite ends of the stage, the back section being spaced away rearwardly from the stage and extending downwardly from the level of the top surface thereof, illumination for the stage comprising front and back lights independently controllable, the front lights being positioned above the stage to shine down on the top surface thereof, the back lights being positioned below the level of the stage in position to shine upwardly through the space between the stage and the back section of the background scenery, bearing-circle discs distributed over the area of the stage and positioned each to support a model ship at the level of the top surface of the stage, and mechanism operable to rotate the discs in synchronism.

2. In apparatus as defined in claim 1, the top surface of the stage being curved downwardly towards its forward end.

3. In apparatus as defined in claim 1, a hinged flap extending along the stage embedded in its top surface and mechanism operable to rotate the flap to project upwardly from the top surface of the stage to mask thereby model ships positioned on the stage behind the flap to a predetermined extent.

THOMAS F. BROADY.
ROBERT C. HEERDINK.
LEONARD C. MARCHESKI.

REFERENCES CITED

The following references are of record in the file of this patent:

UNITED STATES PATENTS

| Number | Name | Date |
| --- | --- | --- |
| 1,530,749 | Anthony | Mar. 24, 1925 |
| 1,779,766 | Gibbons | Oct. 28, 1930 |
| 2,145,457 | Patterson | Jan. 31, 1939 |
| 2,401,975 | Simjian | June 11, 1946 |